Patented Mar. 18, 1952

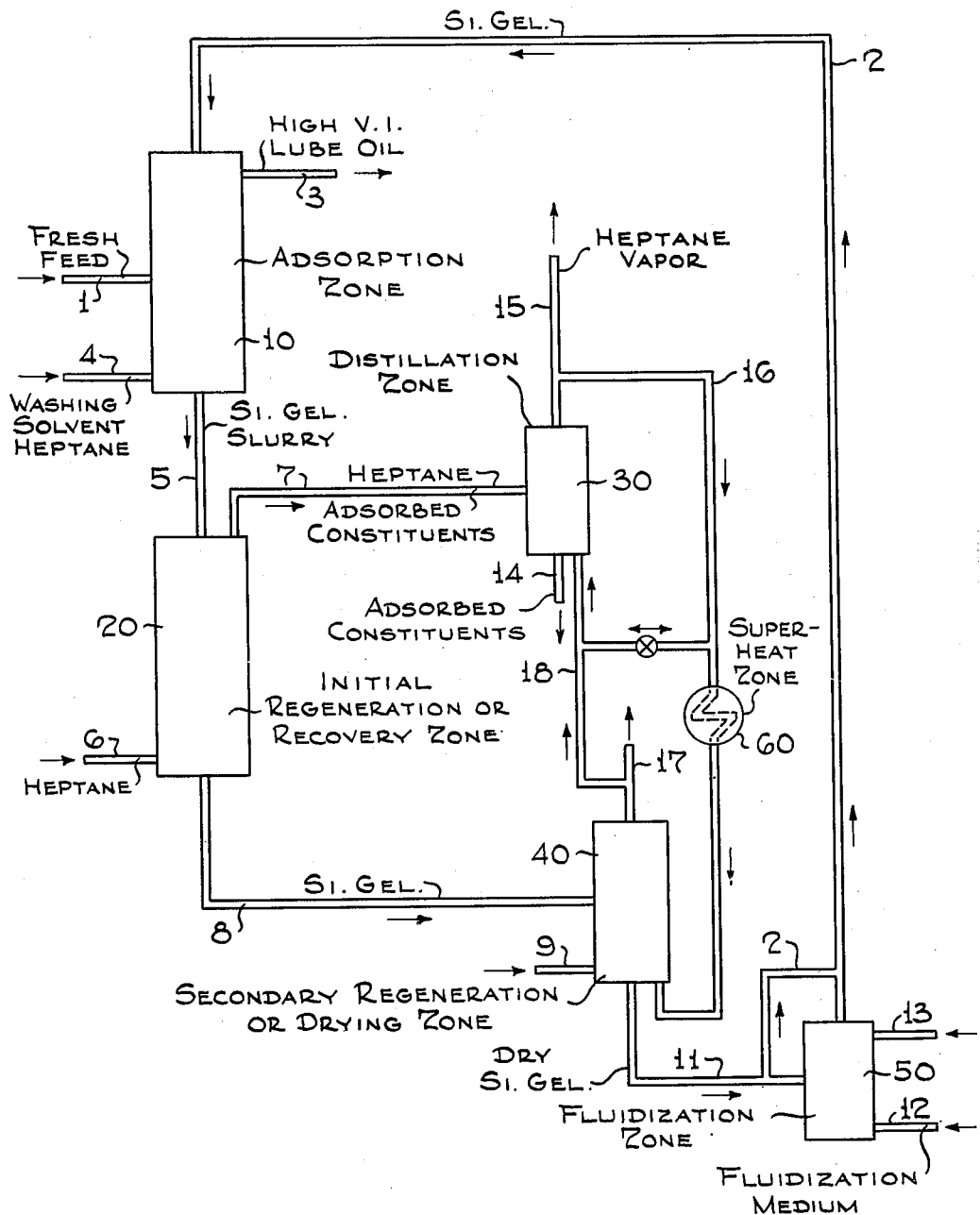

2,589,981

UNITED STATES PATENT OFFICE 2,589,981

DRYING OF SOLID ADSORBENTS

Robert L. Weeks, Union, N. J., assignor to Standard Oil Development Company, a corporation of Delaware Application July 16, 1948, Serial No. 39,005

2 Claims. (Cl. 260—674)

The present invention is concerned with the segregation of more aromatic or polar type materials from more paraffinic type materials. The invention is more specifically directed to the treatment of petroleum hydrocarbons with silica gel for the segregation of various fractions. The invention is especially directed toward a new and improved method for removing adsorbed compounds from the silica gel and for the complete revivification and regeneration of the same. In accordance with the process of the present invention, silicon gel containing adsorbed compounds is removed from an adsorption zone and treated in a secondary zone with a suitable solvent in the liquid phase under temperature and pressure conditions adapted to secure substantially complete removal of adsorbed compounds from the silica gel. The silica gel is then passed to a tertiary stage and treated with a vaporous superheated solvent in order to secure substantially complete removal of the desorbing agent therefrom. In accordance with the preferred adaptation of the present invention, the desorbing agent utilized for the removal of the adsorbed compounds in the regeneration or secondary stage is removed from the regeneration stage with the adsorbed constituents and handled in a distillation zone to segregate the desorbing agent from the adsorbed constituents.

The desorbing agent is removed overhead as a vapor from the distillation zone, superheated in a heating zone and then utilized in the tertiary or drying zone to completely remove the desorbing agent from the silica gel.

It is well known in the art to employ various solid adsorbents in order to segregate various types of hydrocarbons from one another. For instance, it is well known in the art to utilize silica gel in order to segregate aromatic or polar type constituents from paraffinic type constituents. One process of this character is the treatment of petroleum oil fractions boiling in the lubricating oil boiling range in order to remove cyclic constituents therefrom and thus increase the viscosity index of the lubricating oil. Various procedures and methods for conducting the operation are also well known.

However, one problem encountered in processes of the character mentioned, is that it is relatively difficult or expensive to completely regenerate or reactivate the silica gel which contains the adsorbed constituents. This is particularly the case when the adsorbed constituents boil in the gas oil, lubricating oil and higher boiling ranges. The regeneration or revivification operations are particularly difficult when it is desired that the silica gel be regenerated in a dry state, and that it be relatively substantially completely free of adsorbed constituents.

In accordance with the process of the present invention it is possible to completely revivify or regenerate the silica gel. The process comprises utilizing an adsorption zone in conjunction with a two-stage regeneration or revivification zone. In the first stage of the regeneration treatment the silica gel is treated with a suitable desorbing solvent under temperature and pressure conditions adapted to maintain the desorbing solvent in the liquid phase. In the secondary stage, the silica gel is treated with a desorbing solvent preferably the one employed in the initial stage of the regeneration operation under temperature and pressure conditions wherein the desorbing solvent is present as a superheated vapor.

The process of the present invention may be readily understood by reference to the drawing illustrating embodiments of the same.

Referring specifically to the drawing feed oil, which for the purpose of illustration is assumed to be a petroleum oil boiling in the lubricating oil boiling range is introduced into adsorption zone 10 at an intermediate point, by means of feed line 1. Silica gel is introduced into the upper part of zone 10 by means of line 2. The oil flows upwardly in zone 10 and countercurrently contacts the downflowing silica gel under temperature and pressure conditions adapted to secure the adsorption of the more aromatic type constituents on the silica gel. The treated high viscosity index lube oil is withdrawn from zone 10 by means of line 3 and further refined as desired. Also for the purpose of illustration, a washing and viscosity breaking solvent is preferably introduced into the lower portion of adsorption zone 10 by means of line 4. This solvent may comprise heptane or an equivalent solvent.

The silica gel is withdrawn from the bottom of adsorption zone 10 as a slurry by means of line 5 and introduced into regeneration zone 20. The silica gel containing the adsorbed constituents flows downwardly in zone 20 and contacts an upflowing recovery solvent which is introduced into the bottom of zone 20 by means of line 6. For the purpose for illustration, it is assumed that the washing solvent employed in zone 10 and the recovery solvent employed in zone 20 is heptane. Temperature and pressure conditions are adjusted in zone 20 so as to enable the recovery solvent heptane to completely remove all adsorbed constituents from the silica gel. The recovery solvent, heptane, is removed from the top of zone 20 by means of line 7 and handled as hereinafter described. The temperature and pressure conditions in zone 20 are so adjusted that the recovery solvent is maintained in the liquid phase. The silica gel substantially completely free of adsorbed constituents and containing thereon the washing solvent is withdrawn from the bottom of zone 20 by means of line 8 and introduced into secondary regeneration zone. In this zone, the silica gel is contacted with superheated solvent which preferably comprises the identical solvent used as a washing solvent and as a recovery solvent. The superheated heptane may be secured from an external source and introduced into the bottom of zone 40 by means of line 9, but is preferably secured as hereinafter described. A silica gel substantially completely free of oily constituents is withdrawn from the bottom of drying zone 40 by means of line 11 and is preferably handled as hereinafter described.

The present invention essentially consists of an adsorption zone and an initial recovery zone and a secondary recovery zone. The silica gel is treated in the initial recovery zone with a liquid washing solvent in order to substantially completely remove the adsorbed constituents therefrom. The silica gel is then treated in the secondary recovery zone with a superheated vaporous solvent which preferably comprises the washing solvent and the recovery solvent in order to completely remove oily constituents and in order to produce a dry silica gel.

Although the silica gel may be returned by any suitable means as illustrated by lines 11 and 2 to the top of adsorption zone 10, a preferred method of returning the silica gel is to introduce the same into zone 50 and to fluidize it by means of an aerating fluidization medium which is introduced into zone 50 by means of line 12. The fluidized silica gel is withdrawn from the top of zone 50 by means of line 2 and recycled to zone 10. Fresh silica gel may be introduced into the system by means of line 13.

A preferred adaptation of the present invention with respect to the handling of the washing and recovery solvent is as follows: For the purpose of illustration, it is assumed that the solvent comprises heptane. The heptane containing the adsorbed constituents is withdrawn from zone 20 by means of line 7 and passed into distillation zone 30 wherein temperature and pressure conditions are adjusted to secure segregation of the respective constituents. The adsorbed or aromatic constituents recovered from the silica gel are removed from the bottom of distillation zone 30 by means of line 14 and further refined and handled in any manner desired. The heptane solvent is removed overhead as a vapor from zone 30 by means of line 15 and may be withdrawn from the system. For example, this fraction may be condensed and recycled to either zone 10 or zone 20. However, it is preferred that at least a portion of this vaporous stream be withdrawn by means of line 16, passed through superheating zone 60 and introduced into the bottom of secondary recovery zone 40.

Another preferred embodiment of the invention is the method of handling the vaporous heptane removed overhead from zone 40. The stream may be removed by means of line 17 and handled in a manner similar to that described with respect to the stream removed by means of line 15. However, in general, it is preferred that at least a portion of the vaporous stream be removed by means of line 18 and introduced into the bottom of distillation zone 30. Under certain conditions, the accordance with the present invention it may be desirable to utilize a portion of the heptane removed overhead from zone 40 and pass this fraction through superheating zone 60 rather than segregating a portion of the vaporous stream removed from zone 30.

As pointed out heretofore, the invention essentially comprises the employment of two recovery zones wherein the silica gel is treated in the initial zone with a liquid agent and in the secondary zone with a vaporous agent which are preferably one and the same.

Although the process may be readily applied when utilizing silica gel for the treatment of any feed oils, it is particularly applicable when treating petroleum oil boiling in the gas oil and lubricating oil boiling ranges. These fractions boil generally within the range of about 600° F. to 1200° F. The amount of silica gel employed may vary appreciably depending upon the particular oil being treated and other factors. In general, from about 2–8 lbs. preferably about 4 lbs. of silica gel are employed per lb. of oil. Pressures may likewise vary appreciably in the adsorption zone, although in general, it is preferred to utilize substantially atmospheric pressures and a temperature in the range from about 70–100° F.

The solvents employed in the adsorption zone may likewise vary appreciably. Although polar type solvents may be employed, it is preferred, particularly in the treatment of lubricating oils to utilize hydrocarbon solvents containing from about 4–8 carbon atoms in the molecule. Particularly desirable solvents are paraffinic solvents containing 6–7 carbon atoms in the molecule. It is to be understood that the solvent may comprise a mixture of various constituents. Other polar solvents such as alcohols, ketones and the like may also be utilized.

The temperatures and pressures employed in the initial regeneration zone may vary appreciably depending upon various factors. For example, if the washing solvent employed in the adsorption zone comprises a paraffinic type solvent such as heptane, the temperature in the initial regeneration zone is preferably slightly below the boiling point of the heptane. As a general rule, it is preferred that the temperature maintained in the initial recovery zone is as high as is permissible in order to maintain the solvent in the liquid phase. It is obvious that pressures will allow the temperatures to be varied with respect of any one particular solvent.

The degree of superheat employed in the secondary regeneration zone may vary considerably. In general, it is preferred that the solvent have at least 100° F. superheat and preferably from 150–250° F. superheat. In general, it is preferred that the extent of the superheat be controlled so that from 1 to 3 lbs. of vaporous solvent be utilized in order to remove 1 lb. of liquid solvent from the silica gel in the secondary recovery zone.

Having described my invention, it is claimed:

1. An improved process for the removal of aromatic type compounds from petroleum oils boiling in the gas oil and lubricating oil boiling ranges, which comprises treating the oil in a primary stage with silica gel to remove the more aromatic type compounds from the oil, removing the silica gel from said primary stage and contacting the same in a secondary stage with a liquid paraffin hydrocarbon solvent having from 4 to 8 carbon atoms in the molecule at a temperature just slightly below the boiling point of the solvent wherein the adsorbed aromatics are removed from the silica gel, removing the silica gel from said secondary stage and contacting the same in a tertiary stage with superheated vapors of the same paraffin hydrocarbon solvent.

2. Process as defined by claim 1 wherein said liquid paraffin hydrocarbon solvent is heptane.

ROBERT L. WEEKS.

REFERENCES CITED

The following references are of record in the file of this patent:

UNITED STATES PATENTS

| Number | Name | Date |
|---|---|---|
| 2,398,101 | Lipkin | Apr. 9, 1946 |
| 2,415,315 | Walter et al. | Feb. 4, 1947 |
| 2,441,572 | Hirschler et al. | May 18, 1948 |
| 2,448,489 | Hirschler | Aug. 31, 1948 |
| 2,449,402 | Lipkin et al. | Sept. 14, 1948 |
| 2,464,311 | Hiatt et al. | Mar. 15, 1949 |